(12) United States Patent
Kerstiens et al.

(10) Patent No.: US 9,341,112 B2
(45) Date of Patent: *May 17, 2016

(54) COMBINATION AIR PRESSURE SYSTEM AND PLASMA ION GAS GENERATOR SYSTEM FOR TURBOCHARGED DIESEL ENGINE

(71) Applicant: CFT GLOBAL, LLC, Denver, CO (US)

(72) Inventors: Kenny Kerstiens, Denver, CO (US); Patric Galvin, Evergreen, CO (US)

(73) Assignee: CFT GLOBAL, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,487

(22) Filed: Sep. 30, 2013

(65) Prior Publication Data
US 2014/0102886 A1    Apr. 17, 2014

Related U.S. Application Data

(63) Continuation of application No. 13/317,392, filed on Oct. 18, 2011, now Pat. No. 8,544,452, which is a continuation-in-part of application No. 13/068,766, filed on May 11, 2011, now abandoned.

(51) Int. Cl.
    *F02B 43/10* (2006.01)
    *F02M 25/12* (2006.01)

(52) U.S. Cl.
    CPC ............... *F02B 43/10* (2013.01); *F02M 25/12* (2013.01); *Y02T 10/121* (2013.01)

(58) Field of Classification Search
    CPC ........ F02B 43/10; F02M 25/12; Y02T 10/121

USPC .............................................. 123/3, 539, 1 A
See application file for complete search history.

(56) References Cited

U.S. PATENT DOCUMENTS

| | | | |
|---|---|---|---|
| 3,955,941 A | 5/1976 | Houseman et al. |
| 4,023,545 A | 5/1977 | Mosher et al. |
| 4,090,838 A | 5/1978 | Schena et al. |
| 4,091,086 A | 5/1978 | Hindin et al. |

(Continued)

FOREIGN PATENT DOCUMENTS

WO    2011016792 A1    2/2011

OTHER PUBLICATIONS

Non-Final Office Action issued in U.S. Appl. No. 13/068,766 on Jan. 25, 2013, 17 pages.

(Continued)

*Primary Examiner* — Marguerite McMahon
(74) *Attorney, Agent, or Firm* — Dorsey & Whitney LLP

(57) ABSTRACT

A combination air pressure system and a plasma ion gas generator system adapted for mounting next to an intake manifold of a turbocharged diesel engine. The system includes a water holding tank for supplying water to a plasma ion gas generator. The gas generator includes a housing with a plurality anode and cathode electrode plates. The system also includes an on/off switch and amp meter. The on/off switch is connected to the vehicle's battery. When the system is turned "on", power is supplied to the gas generator for generating combustible gases. The air pressure system includes an air line connected to a vehicle's high pressure air line. The system's air line is connected to the water holding tank for pressurizing the gas mixture before it's introduced in the intake manifold.

15 Claims, 1 Drawing Sheet

(56) References Cited

U.S. PATENT DOCUMENTS

| | | |
|---|---|---|
| 4,155,712 A | 5/1979 | Taschek |
| 4,382,189 A | 5/1983 | Wilson |
| 4,421,072 A | 12/1983 | Mischenko et al. |
| 4,442,801 A | 4/1984 | Glynn et al. |
| 4,567,857 A | 2/1986 | Houseman et al. |
| 4,573,435 A | 3/1986 | Shelton |
| 5,105,773 A | 4/1992 | Cunningham et al. |
| 5,231,954 A | 8/1993 | Stowe |
| 5,272,871 A | 12/1993 | Oshima |
| 5,458,095 A | 10/1995 | Post et al. |
| 6,336,430 B2 | 1/2002 | de Souza et al. |
| 6,531,790 B2 | 3/2003 | Panuce et al. |
| 7,013,845 B1 | 3/2006 | McFarland et al. |
| 7,240,641 B2 | 7/2007 | Balan et al. |
| 7,393,369 B2 | 7/2008 | Shurtleff |
| 7,430,991 B2 | 10/2008 | VanHoose et al. |
| 7,444,998 B2 * | 11/2008 | Yatsenko et al. ............ 123/536 |
| 8,057,646 B2 | 11/2011 | Hinatsu et al. |
| 8,100,092 B2 | 1/2012 | McBride et al. |
| 8,347,829 B2 | 1/2013 | Harper |
| 8,381,852 B2 | 2/2013 | Zolman et al. |
| 8,544,452 B1 | 10/2013 | Galvin et al. |
| 8,714,115 B2 | 5/2014 | McConahay et al. |
| 8,864,964 B2 | 10/2014 | Aggelopoulos |
| 2001/0003276 A1 | 6/2001 | De Souza et al. |
| 2002/0104697 A1 * | 8/2002 | Hatanaka ................ 180/65.4 |
| 2006/0174686 A1 | 8/2006 | McFarland et al. |
| 2008/0047502 A1 | 2/2008 | Morse |
| 2008/0047830 A1 | 2/2008 | Fairfull et al. |
| 2008/0283411 A1 | 11/2008 | Eastman et al. |
| 2008/0302670 A1 | 12/2008 | Boyle |
| 2009/0301407 A1 * | 12/2009 | Cerny et al. ................ 123/3 |
| 2010/0065419 A1 | 3/2010 | Richardson |
| 2010/0180838 A1 * | 7/2010 | Lewis et al. ................ 123/3 |
| 2011/0100328 A1 | 5/2011 | Paul |
| 2011/0132751 A1 | 6/2011 | Smedley |
| 2011/0174241 A1 | 7/2011 | McConahay et al. |
| 2012/0298521 A1 | 11/2012 | Richardson |

OTHER PUBLICATIONS

Restriction Requirement issued in U.S. Appl. No. 13/136,070 on Nov. 13, 2013, 6 pages.

PCT International Search Report and Written Opinion dated Aug. 13, 2014, for International Application No. PCT/US14/30919, 11 pages.

* cited by examiner

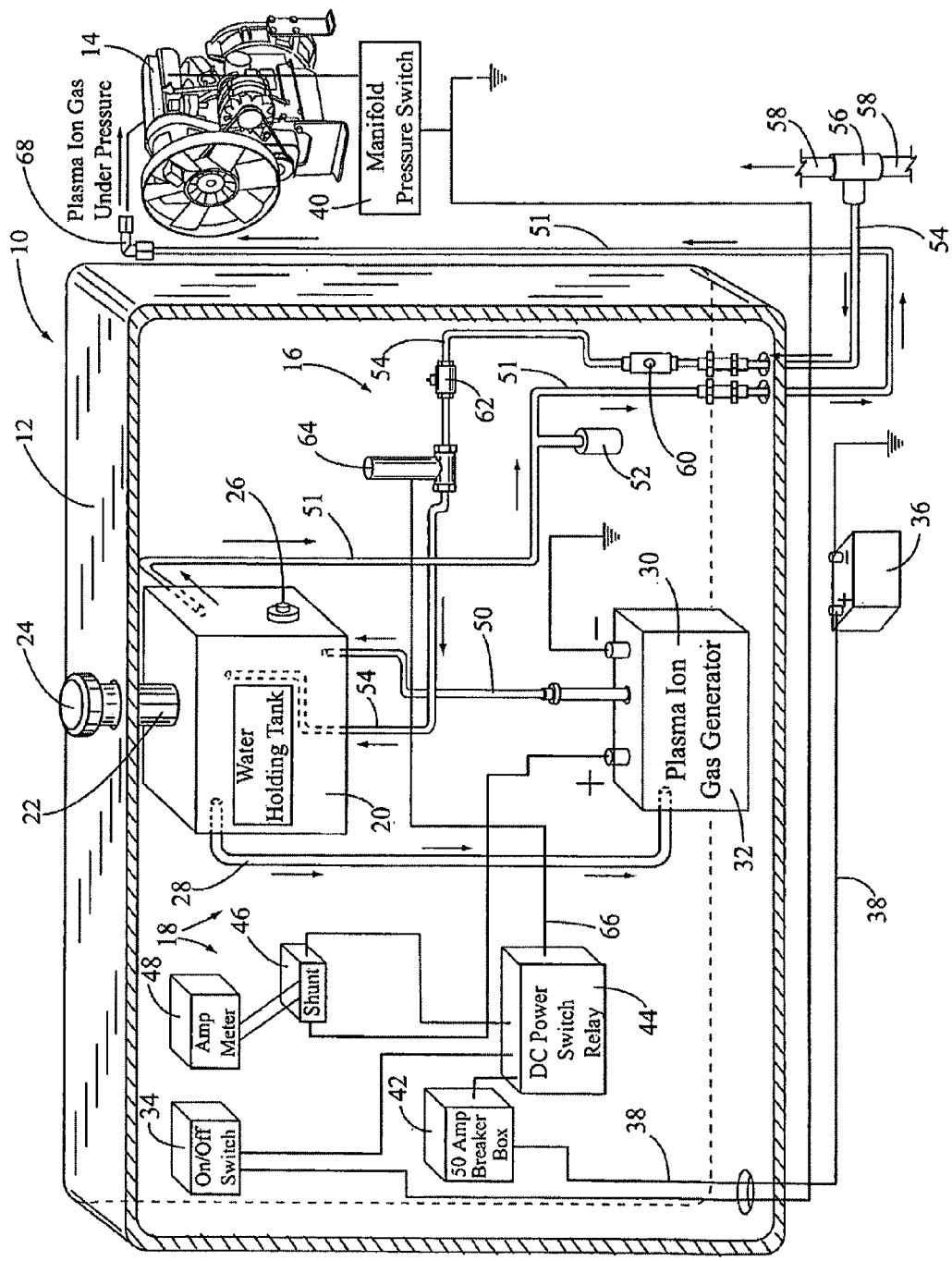

COMBINATION AIR PRESSURE SYSTEM AND PLASMA ION GAS GENERATOR SYSTEM FOR TURBOCHARGED DIESEL ENGINE

This non-provisional patent application is a continuation of and claims priority to U.S. patent application Ser. No. 13/317,392, filed on Oct. 18, 2011, having a title of "Combination Air Pressure System and Plasma Ion Gas Generator System for Turbocharged Diesel Engine," which is a continuation-in-part of U.S. patent application Ser. No. 13/068,766, filed on May 20, 2011, having a title of "Ionized Plasma Gas Generator System for an Internal Combustion Engine", by the subject inventors. These applications (Ser. No. 13/317,392 and Ser. No. 13/068,766) are hereby incorporated by reference in their entirety.

BACKGROUND OF THE INVENTION (a) Field of the Invention

This invention relates to a combination of systems for introducing gases under pressure into an intake manifold of a turbocharged diesel engine and more particularly, but not by way of limitation, to an air pressure system adapted for mounting on a vehicle and next to a vehicle's diesel engine for overcoming manifold intake air pressure, when supplying a mixture of plasma ion gas into the intake manifold of the engine. The mixture of the plasma ion gas including hydrogen gas, oxygen gas, Brown's gas, HHO, nascent hydrogen and oxygen gas, and hydrinos sufficient to enhance diesel fuel introduced into the intake manifold. The mixture of gases introduced under pressure into the intake manifold greatly increases vehicle mileage per gallon of fuel, improves fuel combustion at a low combustion temperature with reduced hydrocarbon emissions, reduces greenhouse gas emissions and reduces engine maintenance.

(b) Discussion of Prior Art

Heretofore, there have been a large number of issued patents related to hydrogen gas generator for internal combustion engines. These patents disclose complex and expensive apparatus and methods for generating hydrogen gas using an electrolysis cell and require a major redesign of a standard diesel engine and the engine's exhaust system. These patents include U.S. Pat. Nos. 3,955,941 and 4,567,857 to Houseman et al., U.S. Pat. No. 4,155,712 to Taschek, U.S. Pat. No. 4,421,072 to Mischenko et al., U.S. Pat. No. 4,573,435 to Shelton, U.S. Pat. No. 5,272,871 to Oshima et al., U.S. Pat. No. 4,382,189 to Wilson, U.S. Pat. No. 4,091,086 to Hindin et al., U.S. Pat. No. 7,240,641 to Balan et al., and U.S. Pat. No. 7,393,369 to Shurtleff.

None of these prior art references disclose the unique combination of an air pressure system with a plasma ion gas generator system used for overcoming an air intake pressure into the intake manifold of a diesel fuel engine and similar applications.

SUMMARY OF THE INVENTION

In view of the foregoing, it is a primary objective of the subject invention to provide an air pressure system incorporated into an ionized plasma gas generator system that is inexpensive, easy to install under the hood of a truck, tractor with trailer and similar type of vehicles and next to a diesel engine. The combination of the two systems supplies air under pressure to a gas mixture. The pressurized gas mixture is then introduced into the engine's intake manifold for increasing mileage per gallon in a range of 10 to 25% and greater during highway use. The combination of systems can also be used with mobile and stationary engines. While the invention is discussed herein used with a diesel engine, it can also be used with bio-diesel, compressed natural gas, powdered coal, and gasoline operated vehicles. Also, the systems can be used independently or in conjunction with other power sources to provide the gas mixture to other power generating systems, such as fuel cells, steam engines, hydrogen engines or for other uses, such as heating ovens, ranges and infared catalytic heaters.

Another key object is the combination of the air pressure system and the gas generator system greatly improves fuel combustion at a substantially lower temperature with far less hydrocarbon emissions and with reduced engine maintenance expense.

Still another object of the invention is the air pressure and air volume of the air pressure system mixture can be regulated with the gas mixture as it's introduced into the engine's intake manifold for optimum performance. The increased pressure of the gas mixture introduced into the intake manifold provides for more rapid deconstruction of the organic molecular fuel structure thus a more rapid burn at lower temperatures and creating less greenhouse gasses through better utilization of fuel and lower NOX formation.

The combination of the air pressure system with the plasma ion gas generator system, adapted for mounting under a hood of a truck or similar vehicle and next to the intake manifold of a diesel engine, includes an electrolyte or water holding tank for supplying water to a plasma ion gas generator. The gas generator includes a generator housing with a plurality of spaced apart anode and cathode electrode plates. The system also includes an on/off switch and amp meter. The on/off switch is connected to the vehicle's battery. When the system is turned "on", power is supplied to the gas generator for generating a mixture of combustible gases. The air pressure system includes an air line connected to a vehicle's high pressure air line. An air pressure regulator value is connected to the air line for adjusting the air pressure above the air pressure introduced into the intake manifold. Also, an air flow valve is connected to the air line for adjusting the volume of air flow through the line. The air line is then connected to the water holding tank for pressurizing the gas mixture before it is introduced in the engine's air intake manifold.

These and other objects of the present invention will become apparent to those familiar with different types of manifold air pressure systems and gas generator systems used with an internal combustion engine, when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawing illustrates complete preferred embodiments in the present invention according to the best modes presently devised for the practical application of combination air pressure system and plasma ion gas generator system as described herein:

FIG. 1 illustrates a schematic diagram of the key components making up the combination air pressure system and plasma ion gas generator system for generating a gas mixture under pressure into an intake manifold of a turbocharged diesel engine.

DETAILED DESCRIPTION OF THE PREFERRED EMBODIMENTS

In FIG. 1, the subject combination air pressure and plasma ion gas generator system is shown having general reference numeral 10. The combination system 10 is mounted in a system housing 12 and adapted for introducing a gas mixture under pressure to an intake manifold of a turbocharged diesel engine 14. The combination system includes air pressure system, having a general reference numeral 16 and a plasma ion gas generator system, having a general reference numeral 18.

The plasma ion gas generator system 18 includes a water holding tank 20 with a water fill port 22, a fill cap 24 in the top of the housing 12, and a water level indicator 26 in the side of the tank 20. The water level indicator 26 is used to indicate low water in the system 18. The water holding tank 20 typically holds from 2 to 20 gallons of fluid. The tank 20 is used to feed distilled water, via a water line 28, into a side of a plasma ion gas generator 30 having a generator housing 32 with a plurality of spaced apart anode and cathode plates mounted therein. The plates aren't shown in this drawing.

The plates, having different plate designs and different plate material for increased electronic flux and improved gas output, are disclosed in a companion patent application. The structure and function of the different plates found in this patent application are incorporated herein by reference. The companion patent application has a Ser. No. 13/136,070, filed on Jul. 25, 2011, with a title of "Etched Electrolysis Plates for Increased Gas Generator to an Internal Combustion Engine", by the subject inventors.

The gas generator system 18 includes an on/off switch 34 for applying electrical power thereto. The on/off switch 34 is connected to a vehicle's battery 36 via an electric lead 38. The on/off switch 34 can be turned "on" manually or automatically activated by a manifold pressure switch 40 connected to the engine 14. The lead 38 is connected to an inline 50 amp breaker box 42 to protect the system 18 due to a power surge or a power failure. Also, the lead 38 is connected to a DC power relay switch 44 and a shunt 46. The shunt 46 is connected to a positive pole on the gas generator 30 and an amp meter 48. The amp meter 48 is used to monitor the status of the electrolysis gas produced from the plasma ion gas generator 30.

When the system 18 is turned "on", using the on/off switch 34, power is supplied to the plasma ion gas generator 30 for generating hydrogen gas, oxygen gas, and other gases as mentioned above. The gas is then fed back to the holding tank 20 via a gas discharge line 50 attached to the top of the gas generator 30. The gas, when introduced into the water in the tank, is cooled and scrubbed for removing any fine particulates. The cooled gas then exits out the top of the holding tank 20, under pressure using the air pressure system 16, to a gas manifold line 51, which is connected to the diesel engine's intake manifold for mixing with intake air and diesel fuel. The gas manifold line 51 includes a water condensate filter 52 for removing any water or condensate, such as potassium hydroxide, in the pressurized gas mixture prior to the gas introduction into the intake manifold of the engine 14.

The air pressure system 16, used in combination with the gas generator system 18, includes a high pressure air line 54 connected to an air line "T" fitting 56. The fitting 56 is attached to a vehicle's high pressure air line 58, typically operating at 90 psi and used for air brakes and other air applications on the vehicle. The system's air line 54 is connected to an air pressure regulator 60, which is adjusted to regulate the air pressure in a range of 30 to 50 psi, depending on the pressure of the intake air introduced into the air intake manifold of the engine. The air pressure is adjusted to be at least 10 psi and greater then the manifold intake air pressure. For example, if the intake air pressure introduced into the engine is 40 psi, then the air pressure through the air line 54 would be adjusted to be 50 psi or greater.

From the air pressure regulator 60, the adjusted pressurized air is directed through a 4 to 5 liter per minute volume control valve 62 and through an air flow control valve solenoid 64. The solenoid 64 is connected to the DC power relay 44 via electric lead 66 to shut down the air pressure system 16, should there be a loss of air pressure to the combination system 10.

From the volume control valve 62 and the solenoid 64, the pressurized air enters one side of the water holding tank 20 for pressurizing the mixture of gas found therein. The pressurized gas then exits the tank and into the gas manifold line 51. The gas manifold line 51 exits the housing 12 and is connected to a one-way air flow valve 68 attached to the engine's air intake manifold. The pressurized gas is then mixed with the air introduced into the intake manifold of the turbocharged engine 14.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed The embodiments of the invention for which an exclusive privilege and property right are claimed and are as follows:

1. An automotive system comprising:
   a gas generator having a plurality of anodes and cathodes operable to produce one or more gases from an electrolyte contained therein;
   a water holding tank adapted for receiving water therein;
   a water line having one end attached to a bottom of the water holding tank, the water line having an opposite end attached to the gas generator for supplying water thereto;
   a gas discharge line having one end attached to the generator, the discharge line having an opposite end attached to the side of the water holding tank;
   a gas manifold line having one end attached to the top of the water tank reservoir, the manifold line having an opposite end adapted for attachment to an engine intake manifold;
   a high pressure air line with one end of the air line adapted for attachment to a vehicle's high pressure air line and an opposite end of the air line attached to the water holding tank, the high pressure air line pressurizing the gas received in the tank aid prior to the gas exiting through the gas manifold line.

2. The automotive system of claim 1, further including an air pressure regulator attached to the air line for adjusting the air pressure received through the air line.

3. The automotive system of claim 2, wherein the air pressure regulator adjusts the air pressure in the air line in a range of 30 to 50 psi.

4. The automotive system of claim 1, further including a volume control valve attached to the air line for adjusting the volume of air received through the air line.

5. The automotive system of claim 4, wherein the volume control valve directs the air at between 4 and 5 liters per minute.

6. The automotive system of claim 1, further including an air flow control solenoid attached to the airline and attached to the electrical lead attached to the on/off switch, the air flow control solenoid for shutting down the air pressure system should there be a loss of air pressure to the combination system.

7. The automotive system of claim 1, wherein the cathodes and anodes are plate cathodes and plate anodes.

8. The automotive system of claim 1, wherein the on/off switch is activated by a manifold pressure switch, the manifold pressure switch adapted for attachment to the vehicle's intake manifold.

9. The automotive system of claim 1, wherein the water holding tank includes a water fill port and water fill cap in the top thereof and a water level indicator mounted therein, the water holding tank adapted for receiving 2 to 20 gallons of water.

10. The automotive system of claim 1, further including an amp meter electrically connected to the on/off switch, the amp meter for monitoring the status of the electrolysis gas generated from the generator.

11. The automotive system of claim 1, further including a breaker box connected to the electrical lead and between the on/off switch and the vehicle's battery.

12. The automotive system of claim 1, further including a DC power relay switch connected to the electrical lead and between the on/off switch and the vehicle's battery.

13. The automotive system of claim 1, further including a water condensate filter connected to the gas manifold line for removing water and any condensate in the gas mixture introduced into the intake manifold.

14. The automotive system of claim 1, wherein the engine intake manifold is mounted on a turbocharged engine.

15. The automotive system of claim 1, wherein the gas mixture is supplied to the intake manifold of the turbocharged engine at a pressure greater than the air pressure of intake air introduced into the intake manifold.

* * * * *